United States Patent
Wang et al.

(10) Patent No.: US 8,452,914 B2
(45) Date of Patent: May 28, 2013

(54) ELECTRONIC DEVICES WITH IMPROVED FLASH MEMORY COMPATIBILITY AND METHODS CORRESPONDING THERETO

(75) Inventors: Jia-Ruei Wang, Taoyuan County (TW); Ssu-Po Chin, Taoyuan County (TW)

(73) Assignee: HTC Corporation, Taoyuan (TW)

(*) Notice: Subject to any disclaimer, the term of this patent is extended or adjusted under 35 U.S.C. 154(b) by 64 days.

(21) Appl. No.: 13/196,966

(22) Filed: Aug. 3, 2011

(65) Prior Publication Data

US 2012/0137050 A1 May 31, 2012

Related U.S. Application Data

(60) Provisional application No. 61/417,400, filed on Nov. 26, 2010.

(51) Int. Cl.
 *G06F 13/14* (2006.01)
(52) U.S. Cl.
 USPC ........... 711/103; 711/203; 711/206; 711/209; 710/26
(58) Field of Classification Search
 USPC .................. 711/103, 203, 206, 209; 710/26
 See application file for complete search history.

(56) References Cited

U.S. PATENT DOCUMENTS

| | | | | |
|---|---|---|---|---|
| 5,404,485 | A * | 4/1995 | Ban | 711/202 |
| 5,556,448 | A * | 9/1996 | Cheney et al. | 95/6 |
| 6,957,237 | B1 * | 10/2005 | Traversat et al. | 1/1 |
| 2002/0073277 | A1 * | 6/2002 | Butterworth et al. | 711/113 |
| 2002/0194438 | A1 * | 12/2002 | Lasser | 711/153 |
| 2005/0231515 | A1 | 10/2005 | Gurumoorthy et al. | |
| 2007/0106875 | A1 | 5/2007 | Mather | |
| 2008/0195810 | A1 | 8/2008 | Wu et al. | |
| 2009/0259805 | A1 | 10/2009 | Kilzer et al. | |
| 2009/0287956 | A1 * | 11/2009 | Flynn et al. | 714/6 |
| 2009/0310408 | A1 | 12/2009 | Lee et al. | |

FOREIGN PATENT DOCUMENTS

WO    WO 2009/053962 A2    4/2009

* cited by examiner

*Primary Examiner* — Jae Yu
(74) *Attorney, Agent, or Firm* — Birch, Stewart, Kolasch & Birch, LLP

(57) ABSTRACT

An electronic device with improved flash memory compatibility and a method corresponding thereto are disclosed. The electronic device has a NAND flash, a processing unit and a program memory. The program memory stores application software and codes of an operating system, to be retrieved and executed by the processing unit. The application software requests for NAND flash access in accordance with a specific page size. The operating system acts as an intermediary between the application software and the NAND flash and provides a device driver which allocates a number of physical pages of the NAND flash to each virtual page of the specific page size for responding to NAND flash access requests from the application software by referring to the virtual pages.

16 Claims, 9 Drawing Sheets

ELECTRONIC DEVICES WITH IMPROVED FLASH MEMORY COMPATIBILITY AND METHODS CORRESPONDING THERETO

CROSS REFERENCE TO RELATED APPLICATIONS

This application claims the benefit of U.S. Provisional Application No. 61/417,400, filed Nov. 26, 2010, the entirety of which is incorporated by reference herein.

BACKGROUND OF THE INVENTION

1. Field of the Invention

The present invention relates to electronic devices equipped with flash memories, and in particular relates to flash memory compatibility design to permit use of NAND flashes of various page sizes.

2. Description of the Related Art

Flash memory is a non-volatile computer storage chip that can be electrically erased and reprogrammed. It is generally used in memory cards, USB flash devices, MP3 players, solid-state drives, thumb drives, PDAs and so on for general storage and transfer of data between computers and other digital products.

NAND flash is one kind of flash memory. Generally, the storage space of a NAND flash is divided into a plurality of physical blocks and each physical block is further divided into a plurality of physical pages. Read and programming operations of the NAND flash must be performed one page at a time while unlocking and erasing must happen in block-wise fashion. Therefore, when designing application software of an electronic device equipped with a NAND flash, the physical page size and the physical block size of the NAND flash should be taken into consideration. For example, in a case wherein the equipped NAND flash is divided into pages of 2K+64 bytes, the application software has to be designed to access the NAND flash based on the specific page size, 2K+64 bytes, and, in another case wherein the equipped NAND flash is divided into pages of 4K+128 bytes, the application software has to be designed to access the NAND flash based on another specific page size, 4K+128 bytes. To be compatible with NAND flashes of different page sizes, the design of the application software of the electronic device is very complicated.

BRIEF SUMMARY OF THE INVENTION

An electronic device with improved flash memory compatibility and a method of improving flash memory compatibility of an electronic device are disclosed.

An electronic device in accordance with an exemplary embodiment of the invention comprises a NAND flash, a processing unit and a program memory. The NAND flash includes a plurality of physical blocks, and each of the physical blocks is further divided into a plurality of physical pages. The program memory stores application software and codes of an operating system, to be retrieved and executed by the processing unit. The application software executed by the processing unit requests for NAND flash access in accordance with a specific page size. The operating system, run by the processing unit, acts as an intermediary between the application software and the NAND flash, and provides a device driver which allocates a number of physical pages of the NAND flash to each virtual page of the specific page size for responding to NAND flash access requests from the application software by referring to the virtual pages.

In another embodiment, a method for improving flash memory compatibility of an electronic device is introduced. First, a physical page size of a NAND flash equipped on the electronic device is obtained and a size ratio, 1:N, between the physical page size and a specific page size is determined, where N is a number and the specific page size is defined in the application software of the electronic device for NAND flash access requests. Based on the value of N, a virtual page allocation may be introduced, which allocates N physical pages of the NAND flash to each virtual page. By the virtual pages, the NAND flash access requests from the application software are answered.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1A:
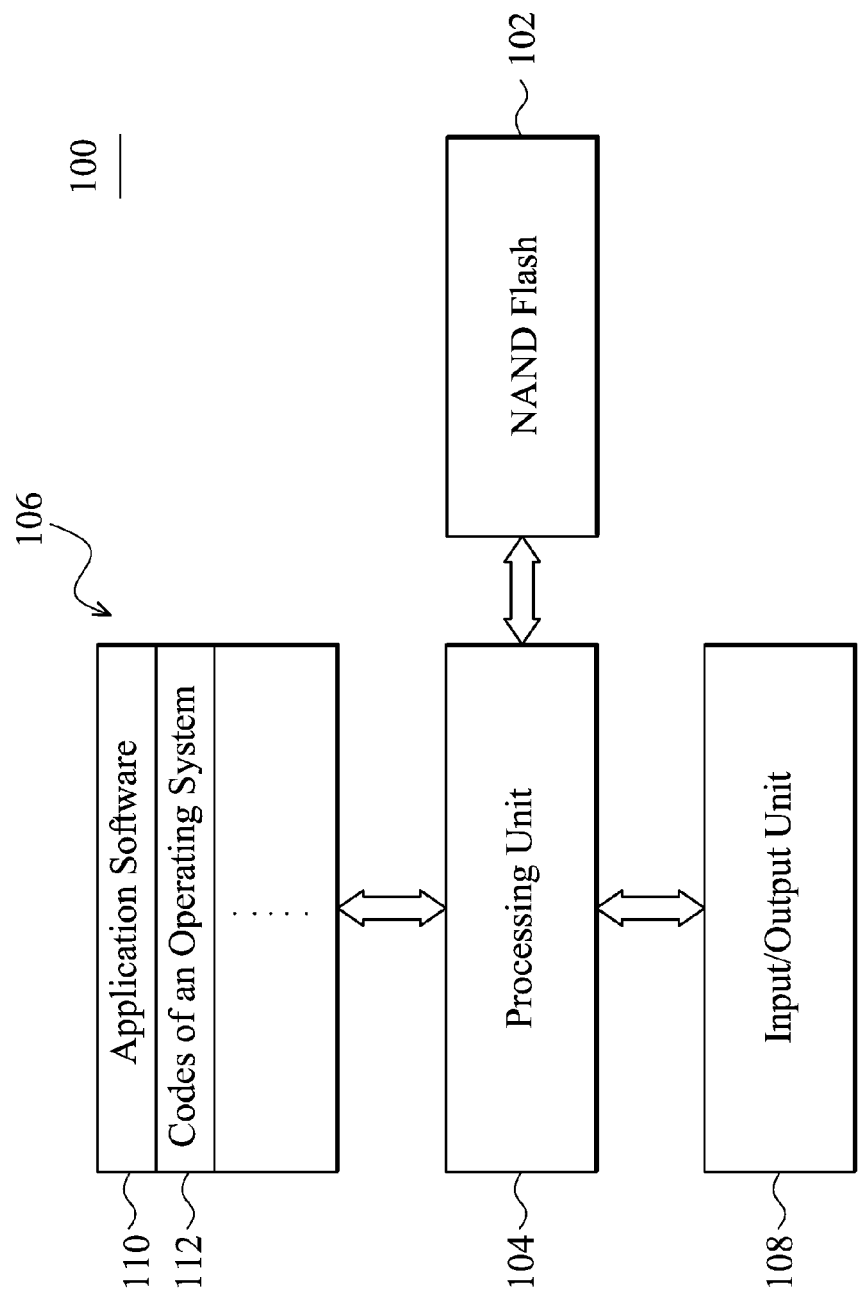
FIG. 1A is a block diagram illustrating an electronic device in accordance with an exemplary embodiment of the invention.

FIG. 1A is a block diagram illustrating an electronic device in accordance with an exemplary embodiment of the invention. The electronic device 100 comprises a NAND flash 102, a processing unit 104, a program memory 106 and an input/output unit 108. The program memory 106 stores application software 110 and codes of an operating system 112. The processing unit 104 may retrieve and execute the codes of the program memory 106 to run various applications and to build an operating system managing the NAND flash 102 and the input/output unit 108.

Figure 1B:
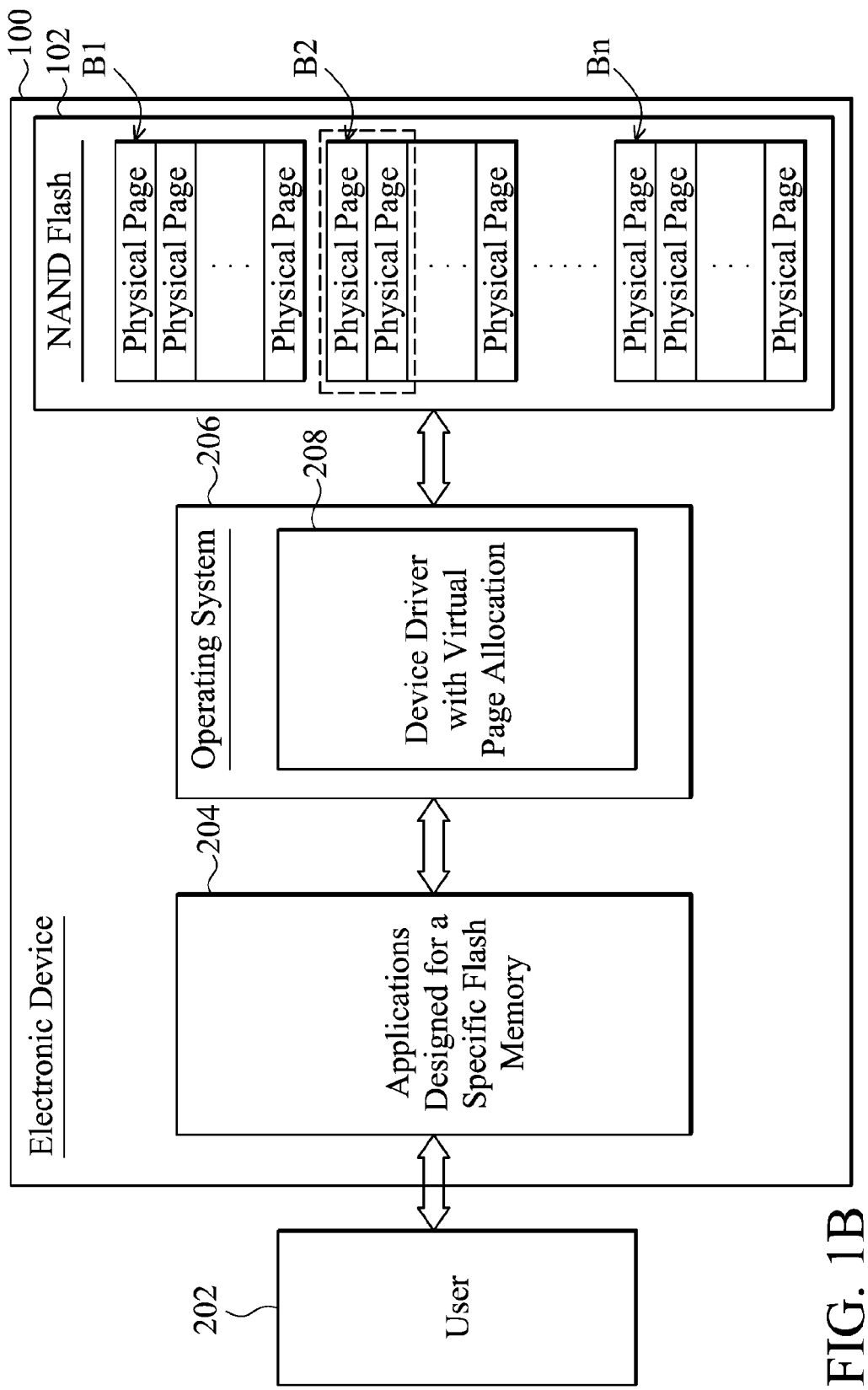
FIG. 1B depicts the software architecture of the electronic device 100.

FIG. 1B depicts the software architecture of the electronic device 100. The user 202 may operate the electronic device 100 by the applications 204. For simplicity, the application software coded for the applications 204 may just be capable of accessing a NAND flash of a specific specification; for example, the NAND flash access requests called by the applications 204 may be only compatible with a specific page size. However, the NAND flash 102 equipped on the electronic device 100, which is divided into physical blocks B1, B2 . . . Bn while each physical block is further divided into physical pages, may have a physical page size distinct from the specific page size defined in the application software. To cope with this problem, a virtual page allocation technology is introduced into the software design of the device driver of the operating system. As shown, the operating system 206 acts as an intermediary between the applications 204 and the NAND flash 102, and, the device driver 208 provided by the operating system 206 provides the virtual page allocation technology. By the virtual page allocation technology, several physical pages of the NAND flash 102 are allocated as one virtual page (referring to the dashed circle). The size of each virtual page matches the specific page size defined for the applications 204. The device driver 208 drives the NAND flash 102 to respond to the NAND flash access requests from the applications 204 by referring to the virtual pages. In this manner, no matter what the physical page size of the NAND flash 102 is, the applications 204 designed for a specific flash memory will work normally. NAND flashes of distinct specifications are compatible with the disclosed electronic device 100.

Figure 2:
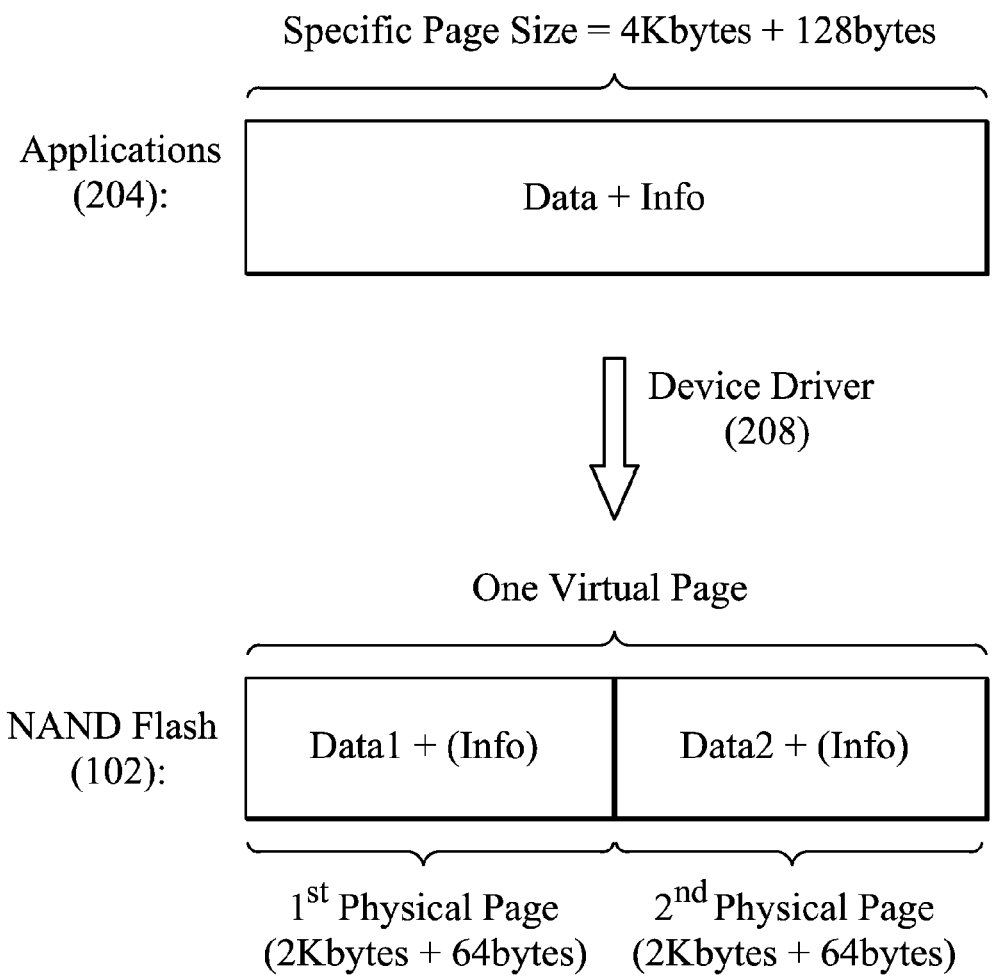
FIG. 2 illustrates the concept of the virtual page allocation.

FIG. 2 illustrates the concept of the virtual page allocation. As shown, the NAND flash requests from the applications 204 may be based on a specific page size—4K+128 bytes, wherein, there is 4 Kbytes for data and 128 bytes for page information like the ECC. By the virtual page allocation of the device driver 208, two physical pages of the NAND flash 102 are allocated as one virtual page. The $1^{st}$ physical page provides 2K+64 bytes and the $2^{nd}$ physical page provides 2K+64 bytes. In this manner, each virtual page is of the specific page size and can properly answer the NAND flash requests from the applications 204. Note that in one virtual page, the data bytes are separated into two parts Data1 and Data2. The first part Data1 is contained in the $1^{st}$ physical page and the second part Data2 is contained in the $2^{nd}$ physical page. As for the information bytes of the virtual page (hereinafter virtual page information), it may be completely contained in the $1^{st}$ physical page or completely contained in the $2^{nd}$ physical page. In another embodiment, both the $1^{st}$ and the $2^{nd}$ physical pages contribute their info bytes to store the virtual page information.

In addition to the aforementioned virtual page allocations, the device driver 208 further involves instruction transformation.

Figure 3:
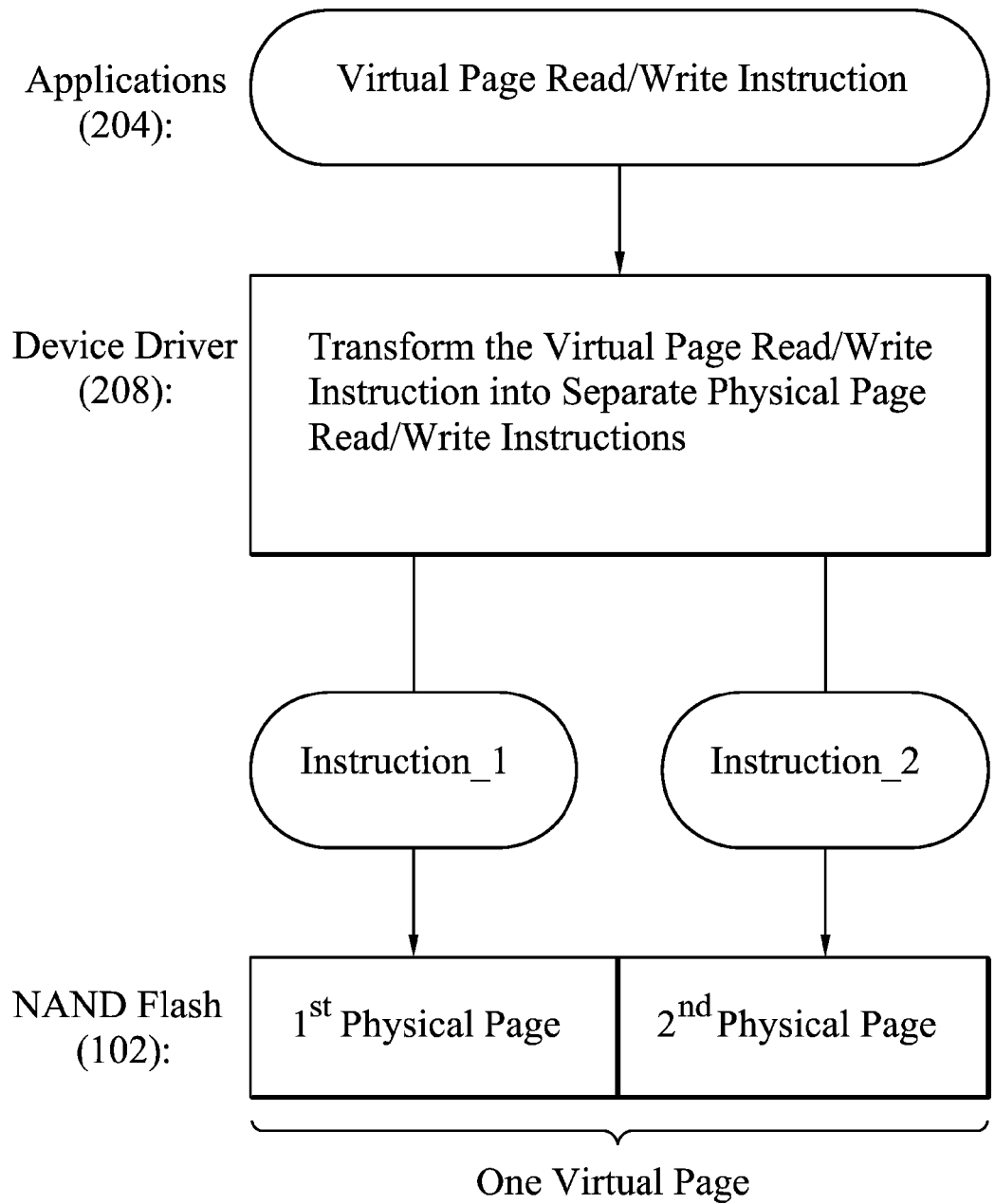
FIG. 3 shows a read/write instruction transformation in terms of pages.

FIG. 3 shows a read/write instruction transformation. In the applications 204, each virtual page read/write instruction is instructed to read/write a complete virtual page. The device driver 208 is operative to transform each virtual page read/write instruction into separate physical page read/write instructions Instruction_1 and Instruction_2. The $1^{st}$ and $2^{nd}$ physical pages of the requested virtual page are read/written by the physical page read/write instructions, Instruction_1 and Instruction_2, respectively.

Figure 4:
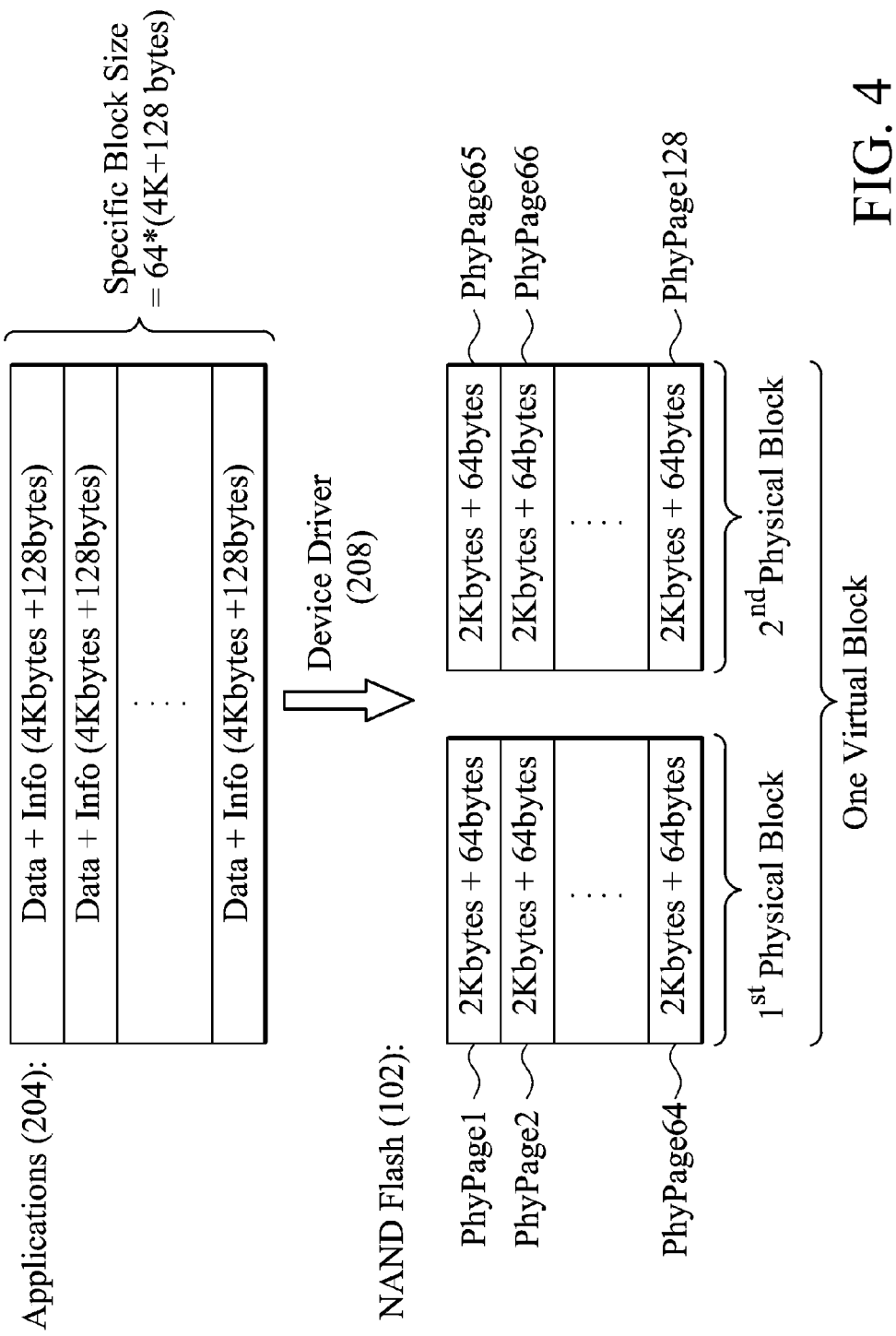
FIG. 4 illustrates the concept of the virtual block allocation.

In another embodiment, the device driver 208 further involves virtual block allocation. FIG. 4 illustrates the concept of the virtual block allocation. In the applications 204, the acceptable block size is limited to a specific value chosen by a designer. The specific block size defined in the application software may determine the size of one virtual block. In the example of FIG. 4, the specific block size is 64*(4K+128 bytes). To drive the NAND flash 102 to respond to the instructions from the applications 204, the device driver 208 allocates two physical blocks (including a $1^{st}$ physical block and a $2^{nd}$ physical block) of the NAND flash 102 as one virtual block. In this embodiment, the $1^{st}$ physical block contains 64 physical pages PhyPage 1-PhyPage64 and the $2^{nd}$ physical block contains 64 physical pages PhyPage65-PhyPage128. Because each physical page contains 2K+64 bytes, the total storage space allocated to one virtual block contains 64*2*(2K+64 bytes), equals to the specific block size defined in the application software. Virtual blocks can also be allocated to respond to instructions from the applications 204. Note that the status of each virtual block (hereinafter, virtual block status, showing the status (e.g. valid/invalid) of all physical blocks forming the virtual block) may be stored in status bytes of the physical blocks. For example, the virtual block statuses may be completely stored by the status bytes of the $1^{st}$ physical block, or, completely stored by the status bytes of the $2^{nd}$ physical block, or, in another example, the virtual block statuses may be spread into status bytes of the $1^{st}$ and $2^{nd}$ physical blocks both.

In addition to the aforementioned virtual block allocations, the device driver 208 further involves instruction transformation in terms of blocks.

Figure 5:
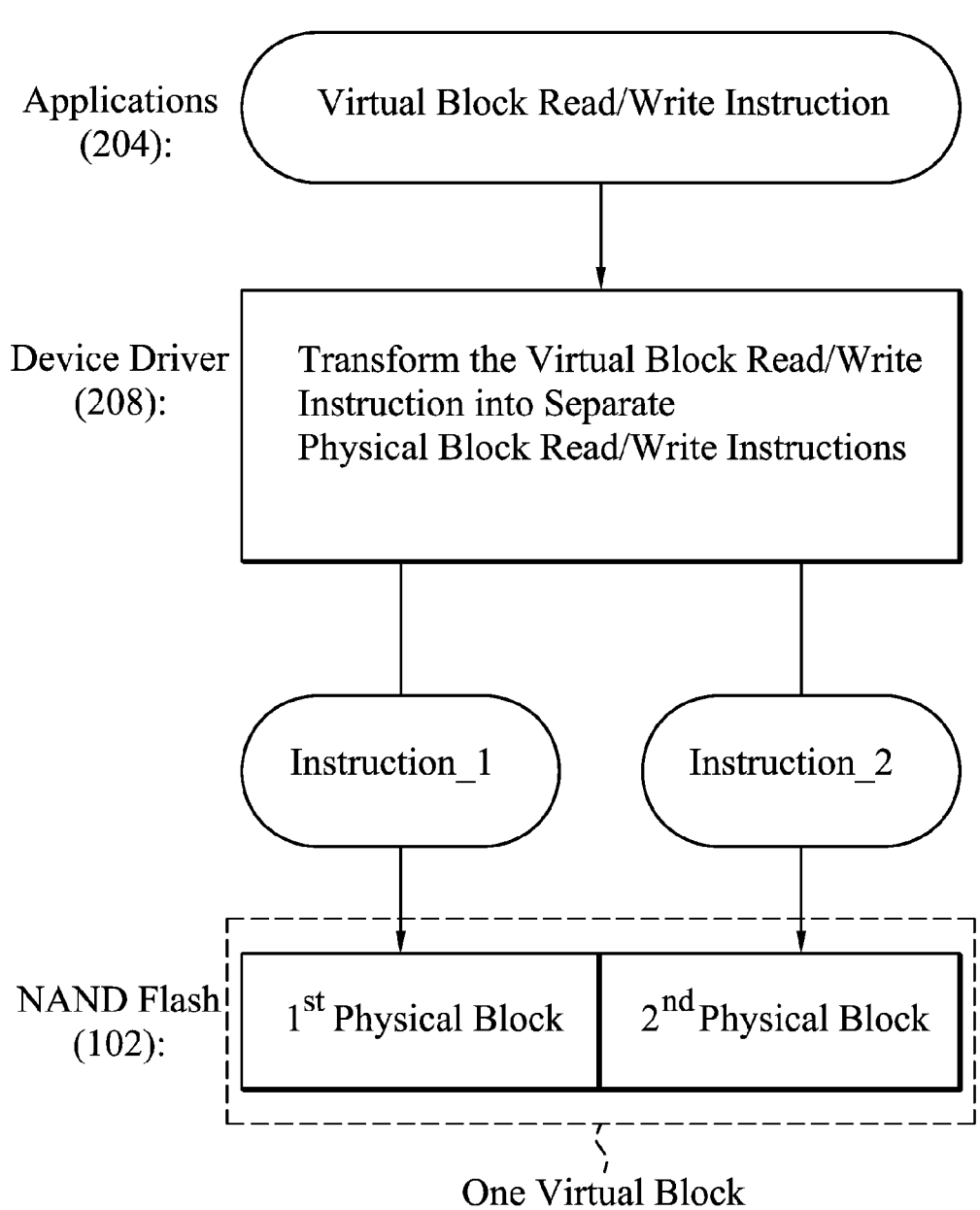
FIG. 5 shows a read/write instruction transformation in terms of blocks.

FIG. 5 shows a read/write instruction transformation. In the applications 204, each virtual block read/write instruction is instructed to read/write a complete virtual block. The device driver 208 is operative to transform each virtual block read/write instruction into separate physical block read/write instructions Instruction_1 and Instruction_2. The $1^{st}$ and $2^{nd}$ physical blocks of the requested virtual block are read/written by the physical block read/write instructions, Instruction_1 and Instruction_2, respectively.

Figure 6:
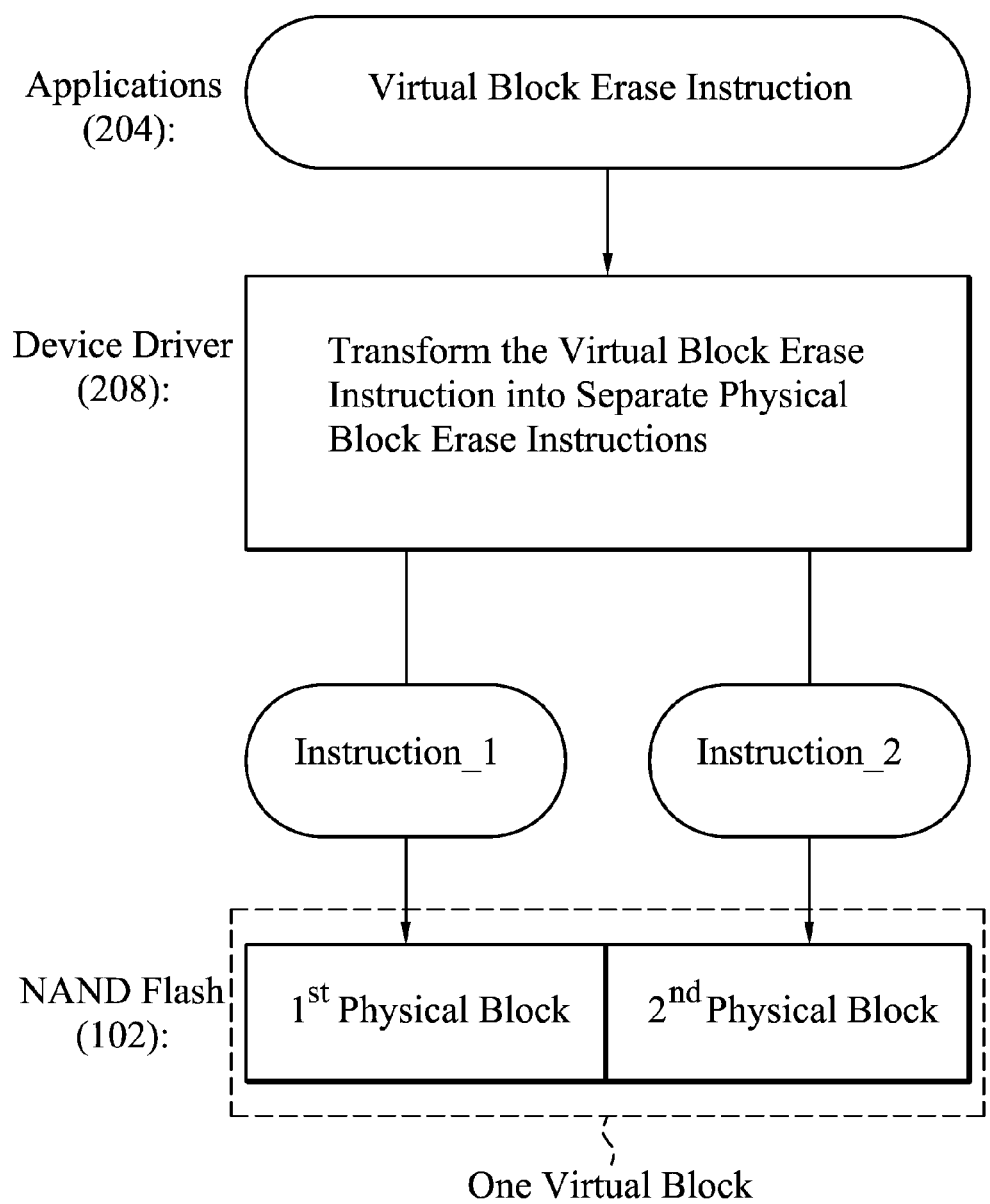
FIG. 6 shows a block erase instruction transformation.

FIG. 6 shows a block erase instruction transformation. In the applications 204, each virtual block erase instruction is instructed to erase a complete virtual block. The device driver 208 is operative to transform each virtual block erase instruction into separate physical block erase instructions Instruction_1 and Instruction_2. The $1^{st}$ and $2^{nd}$ physical blocks of the requested virtual block are erased by the physical block erase instructions, Instruction_1 and Instruction_2, respectively.

Figure 7:
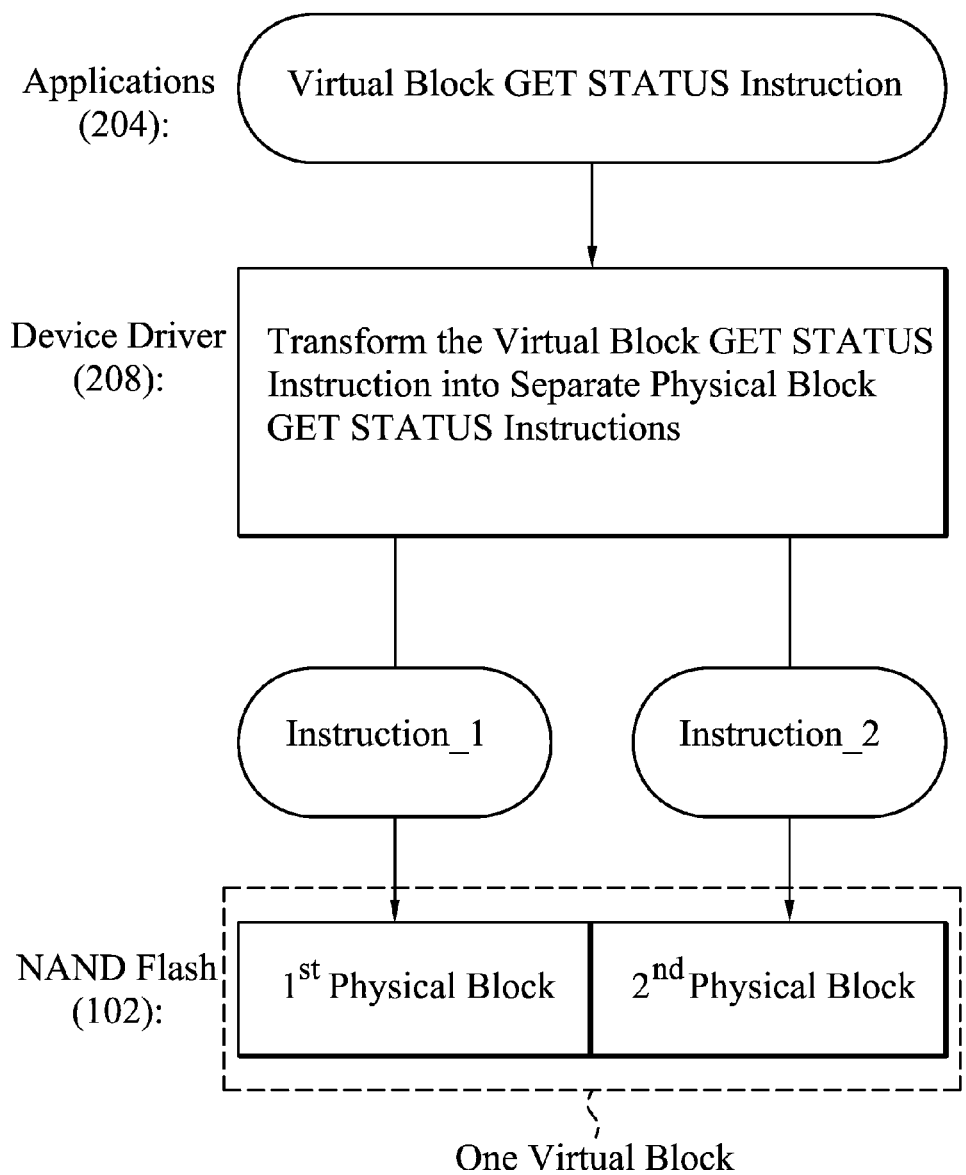
FIG. 7 shows a transformation for a GET STATUS request.

FIG. 7 shows a transformation for a GET STATUS request. GET STATUS instruction is generally used in obtaining block statuses (invalid/valid). In the applications 204, each virtual block GET STATUS instruction is instructed to obtain validity of the requested virtual block. The device driver 208 is operative to transform each virtual block GET STATUS instruction into separate physical block GET STATUS instructions Instruction_1 and Instruction_2. The status of the $1^{st}$ physical block of the requested virtual block is obtained by the physical block GET STATUS instructions Instruction_1 while the status of the $2^{nd}$ physical block of the requested virtual block is obtained by the physical block GET STATUS instructions Instruction_2. When the obtained result shows that any of the physical blocks is invalid, the whole virtual block may be considered as invalid.

Figure 8:
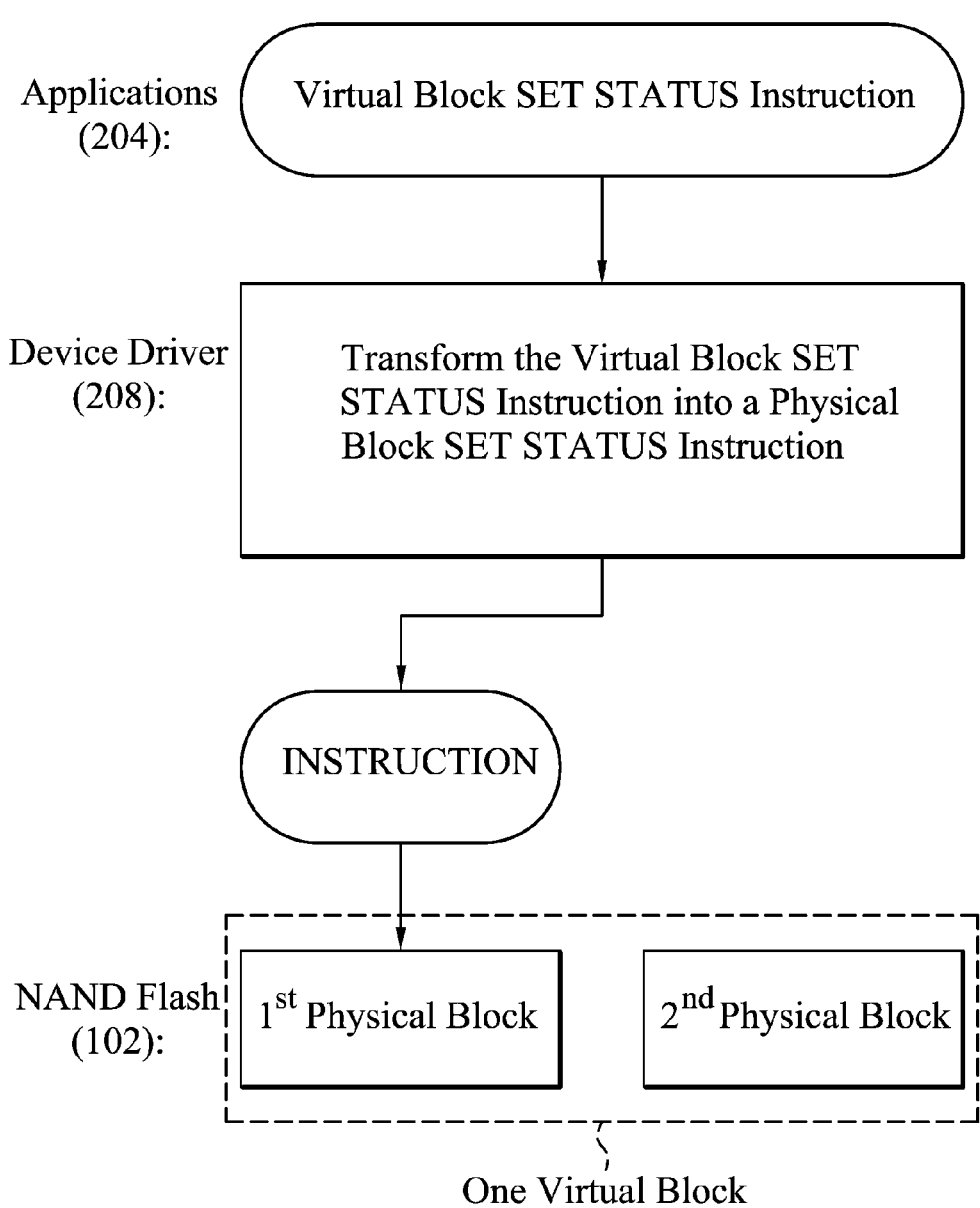
FIG. 8 shows a transformation for a SET STATUS request.

FIG. 8 shows a transformation for a SET STATUS request. A SET STATUS instruction is generally used in setting block statuses (marked as invalid/valid). In the applications 204, each virtual block SET STATUS instruction is instructed to set the status of the requested virtual block. The device driver 208 is operative to transform each virtual block SET STATUS instruction into a physical block SET STATUS instruction INSTRUCTION, to record statuses of the whole virtual block into status bytes of any one of the physical blocks of the requested virtual block. In the example of FIG. 8, the physical block SET STATUS instruction INSTRUCTION records the status of the whole requested virtual block in the spare space of the $1^{st}$ physical block. In another example, the physical block SET STATUS instruction INSTRUCTION may record the status of the whole requested virtual block into the spare space of the $2^{nd}$ physical block.

This paragraph discusses a method for improving flash memory compatibility of an electronic device. First, a physical page size of a NAND flash equipped on the electronic device is obtained and a size ratio, 1:N, between the physical page size and a specific page size is determined, where N is a number and the specific page size is defined in the application software of the electronic device for NAND flash access requests. Based on the value of N, virtual page allocation technology may be implemented, which allocates N physical pages of the NAND flash to each virtual page. By referring to the virtual pages, the NAND flash access requests from the application software are answered properly. The discussed method can be applied in any electronic device equipped with a NAND flash.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device with improved flash memory compatibility, comprising:
    a NAND flash, including a plurality of physical blocks, wherein each of the physical blocks is further divided into a plurality of physical pages;
    a processing unit; and
    a program memory, storing application software and codes of an operating system, wherein:
    the application software executed by the processing unit requests for NAND flash access in accordance with a specific page size; and
    the operating system run by the processing unit acts as an intermediary between the application software and the NAND flash and provides a device driver which allocates a number of the physical pages of the NAND flash to each virtual page of the specific page size for responding to NAND flash access requests from the application software by referring to these virtual pages,
    wherein the device driver provided by the operating system and run by the processing unit further transforms one virtual page read/write instruction requested by the application software into separate physical page read/write instructions to separately read/write the physical pages allocated to form the virtual page that the virtual page read/write instruction wants to access.

2. The electronic device as claimed in claim 1, wherein the device driver provided by the operating system and run by the processing unit further stores virtual page information of each virtual page into info bytes of the physical pages corresponding thereto.

3. The electronic device as claimed in claim 1, wherein the device driver provided by the operating system and run by the processing unit further allocates a number of physical blocks of the NAND flash as one virtual block accessible to the application software.

4. The electronic device as claimed in claim 3, wherein the device driver provided by the operating system and run by the processing unit further stores virtual block statuses of each virtual block into status bytes of the physical blocks corresponding thereto.

5. The electronic device as claimed in claim 3, wherein the device driver provided by the operating system and run by the processing unit further transforms one virtual block read/write instruction into separate physical block read/write instructions to separately read/write the physical blocks that are allocated to form the virtual block that the virtual block read/write instruction wants to access.

6. The electronic device as claimed in claim 3, wherein the device driver provided by the operating system and run by the processing unit further transforms one virtual block erase instruction into separate physical block erase instructions to separately erase the physical blocks that are allocated to form the virtual block that the virtual block erase instruction wants to erase.

7. The electronic device as claimed in claim 3, wherein the device driver provided by the operating system and run by the processing unit further transforms one virtual block GET STATUS instruction into separate physical block GET STATUS instructions to separately obtain statuses of the physical blocks that are allocated to form the virtual block to which the virtual block GET STATUS instruction refers to.

8. The electronic device as claimed in claim 3, wherein the device driver provided by the operating system and run by the processing unit further transforms one virtual block SET STATUS instruction into one physical block SET STATUS instruction, to record statuses of one virtual block into status bytes of any of the physical blocks that are allocated to form the virtual block.

9. A method of improving flash memory compatibility of an electronic device, comprising:
    obtaining a physical page size of a NAND flash equipped on the electronic device, wherein the NAND flash includes a plurality of physical blocks and each of the physical blocks is further divided into a plurality of physical pages;
    determining a size ratio, 1:N, between the physical page size and a specific page size, where N represents a number, and the specific page size defines NAND flash access requests of application software of the electronic device;
    allocating N physical pages of the NAND flash to each virtual page;
    responding to the NAND flash access requests from the application software by referring to the virtual pages, and
    transforming one virtual page read/write instruction requested by the application software into separate physical page read/write instructions to separately read/write the physical pages allocated to form the virtual page to which the virtual page read/write instruction refers to.

10. The method as claimed in claim 9, further storing virtual page information of each virtual page into info bytes of the physical pages corresponding thereto.

11. The method as claimed in claim 9, further allocating N physical blocks of the NAND flash as one virtual block accessible to the application software.

12. The method as claimed in claim 11, further storing virtual block statuses of each virtual block into status bytes of the physical blocks corresponding thereto.

13. The method as claimed in claim 11, further transforming one virtual block read/write instruction into separate physical block read/write instructions to separately read/write the physical blocks that are allocated to form the virtual block to which the virtual block read/write instruction refers.

14. The method as claimed in claim 11, further transforming one virtual block erase instruction into separate physical block erase instructions to separately erase the physical blocks that are allocated to form the virtual block to which the virtual block erase instruction refers to.

15. The method as claimed in claim 11, further transforming one virtual block GET STATUS instruction into separate physical block GET STATUS instructions to separately obtain statuses of the physical blocks that are allocated to form the virtual block to which the virtual block GET STATUS instruction refers.

16. The method as claimed in claim 11, further transforming one virtual block SET STATUS instruction into one physical block SET STATUS instruction, to record statuses of one virtual block into status bytes of any of the physical blocks that are allocated to form the virtual block.

* * * * *